W. F. BLEECKER.

ROTARY ENGINE.

APPLICATION FILED FEB. 24, 1908.

12,874.

Reissued Nov. 10, 1908.

3 SHEETS—SHEET 1.

Witnesses

J. D. Thornburgh.

Otto E. Hoddick

Inventor

Warren F. Bleecker.

By A. H. Bender Attorney

THE NORRIS PETERS CO., WASHINGTON, D. C.

W. F. BLEECKER.

ROTARY ENGINE.

APPLICATION FILED FEB. 24, 1908.

12,874. Reissued Nov. 10, 1908.

3 SHEETS—SHEET 2.

Witnesses

J. D. Thornburgh.

Otto E. Hoddick.

Inventor

Warren F. Bleecker.

By A. J. O'Brien

Attorney

THE NORRIS PETERS CO., WASHINGTON, D. C.

W. F. BLEECKER.
ROTARY ENGINE.
APPLICATION FILED FEB. 24, 1908.
12,874. Reissued Nov. 10, 1908.
3 SHEETS—SHEET 3.
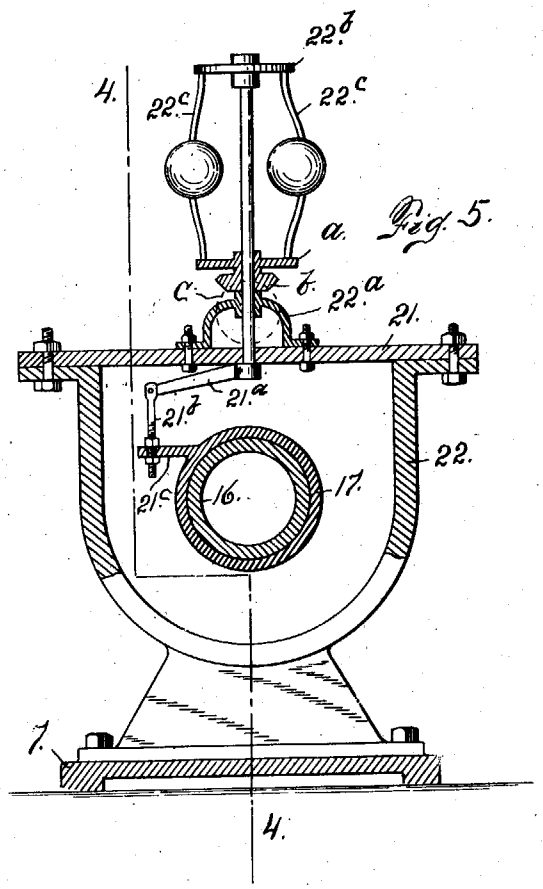
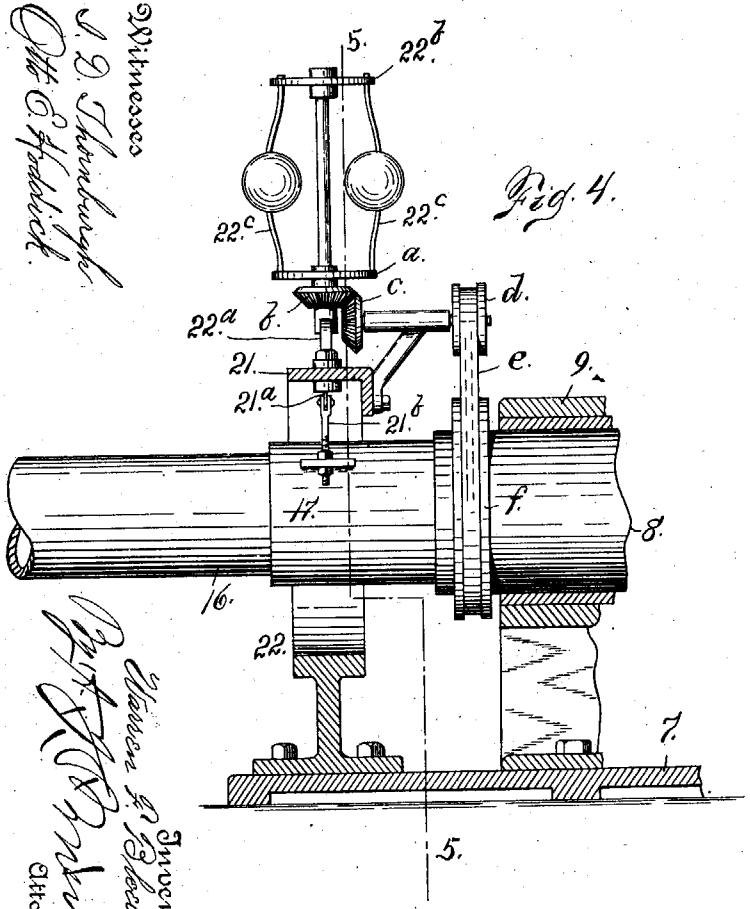
Witnesses
J. D. Thornburgh
Otto E. Hoddick.
Inventor
Warren F. Bleecker.
By H. J. Boden
Attorney.
THE NORRIS PETERS CO., WASHINGTON, D. C.

UNITED STATES PATENT OFFICE.

WARREN FLOYD BLEECKER, OF BOULDER, COLORADO, ASSIGNOR OF ONE-THIRD TO FREDERICK G. BLEECKER, OF GRAND ISLAND, NEBRASKA, AND ONE-THIRD TO MARTIN C. BLEECKER, OF PUEBLO, COLORADO.

ROTARY ENGINE.

No. 12,874. Specification of Reissued Letters Patent. Reissued Nov. 10, 1908.

Original No. 865,964, dated September 10, 1907, Serial No. 306,568. Application for reissue filed February 24, 1908. Serial No. 417,617.

*To all whom it may concern:*

Be it known that I, WARREN FLOYD BLEECKER, a citizen of the United States, residing at Boulder, in the county of Boulder and State of Colorado, have invented certain new and useful Improvements in Rotary Engines; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to improvements in rotary engines, the object being to provide an engine of this type, that will be simple in construction, and in which a high speed may be obtained with an economical use of motive agent.

I will describe a rotary engine embodying my invention and then point out the novel features in the appended claims.

Reference is to be had to the accompanying drawings forming a part of this specification, in which similar characters of reference indicate corresponding parts in all the figures.

Figure 3:
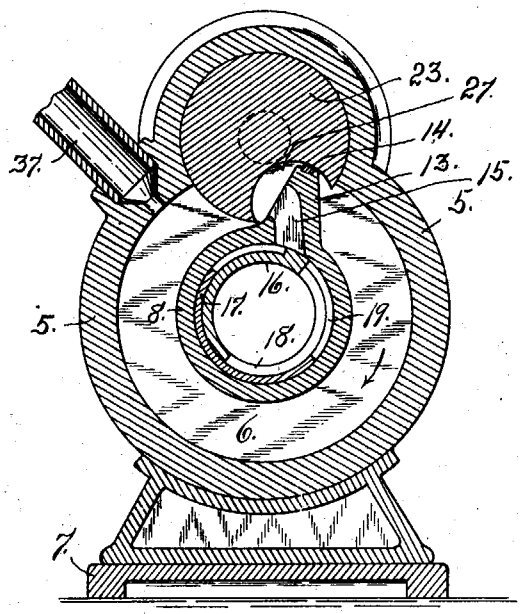
Figure 1:
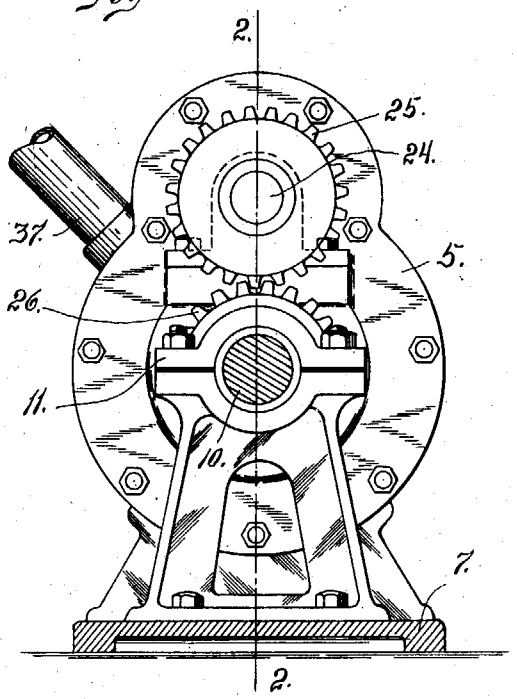
Figure 2:
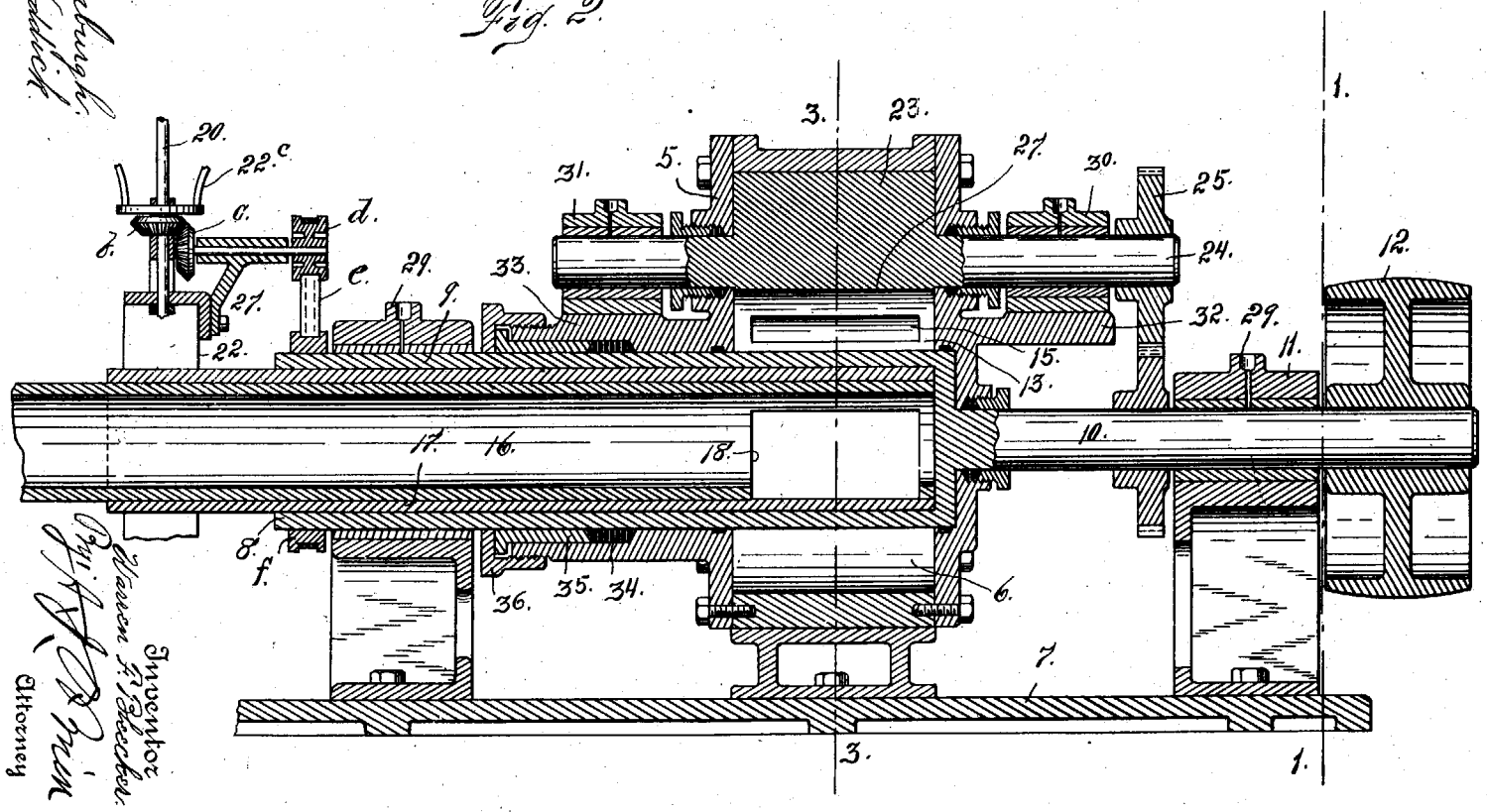

Figure 1 is an elevation, partly in section, on the line 1—1 of Fig. 2, of an engine embodying my invention. Fig. 2 is a section on the line 2—2 of Fig. 1. Fig. 3 is a section on the line 3—3 of Fig. 2. Fig. 4 is a section on the line 4—4 of Fig. 5, showing a governor employed. Fig. 5 is a section on the line 5—5 of Fig. 4.

The engine comprises a casing 5 having a steam cylinder or chamber 6, and this casing is mounted on a base 7. Extended through the casing is a shaft consisting of a tubular member 8 having a bearing in a pillow post 9, and a solid portion 10 having its bearing in a pillow-post 11; and also on this solid portion is a band wheel 12. The tubular portion of the shaft within the steam chamber is provided with a radial wing 13, in the outer edge of which is a packing strip 14 designed to engage with the inner surface of the steam chamber, and at one side of the wing 13 is a port 15, for the admission of steam or other motive agent to bear upon the said wing.

Arranged within the tubular portion of the shaft are tubes 16, 17, and through the inner fixed tube 16 the steam or other motive agent is designed to pass, and thence outward through a port 18 formed in said inner tube. The outer tube 17 is also provided with an opening or port 19, and this outer tube is designed to regulate the opening or port 18, so that the steam or other motive agent may be cut off at any desired time. As a means for regulating the size of opening of the ports, I employ a governor for imparting rotary motion to the tube 17. The said governor, as here shown, consists of a rod 20, movable through a plate 21 on a yoke 22, mounted on the engine base, the lower end of said rod having an arm $21^a$, connected by a link $21^b$ to a lug $21^c$ on the tube 17. The rod passes loosely through a strap $22^a$ to connection with a plate $22^b$, to which the upper ends of spring-arms $22^c$ are attached, the lower ends of said arms being secured to a plate *a*, which is secured to a bevel pinion *b*, meshing with a pinion *c*, and on the shaft of the pinion *c* is a pulley *d*, from which a band *e* leads to a band wheel *f* on the shaft 8.

In the upper portion of the casing is a rotary abutment 23, the said abutment being mounted on a shaft 24, on which is a gear wheel 25, meshing with a gear-wheel 26, on the section 10 of the main shaft. These gear wheels are of equal size, so as to time the movements between the abutment of the wing on the main shaft and, as will be noted in the drawings, the abutment 23 is provided at one side with an opening 27, to permit the passing therethrough of the wing 13. The rotary abutment is lubricated from an oil-cup 28, and oil-cups 29 are arranged on the pillow-standards 9 and 11. The shaft 24 has its bearings in blocks 30, 31, mounted on extensions 32, 33, from the opposite sides of the casing, and to prevent the escape of motive agent around the shaft member 17, I employe a packing 34, engaged by a ring 35, which is pressed into position by means of a screw-collar 36, engaging with a thread formed on said extension 33.

In operation, the steam or other motive agent passes through the tube 16 and out through the port 18, the opening of said port, as before mentioned, being regulated by the governor. As the motive agent passes through the port 15 it will act expansively upon the wing 13, the block 23 serving as an abutment, and upon nearly reaching the limit of the rotary movement, the motive agent will exhaust through the port 37.

Having thus described my invention, what I claim is:

1. A rotary engine comprising a casing having a motive agent chamber, a tubular shaft extended into said chamber and having a port, a radial wing at one side of the port, a tube extended through the hollow shaft and having a port, a tube surrounding the first named tube and having a port, a rotary abutment in the upper portion of the casing, and gear connections between said abutment and the shaft.

2. A rotary engine comprising a casing, a tubular shaft extended into the chamber of the casing and having a port therein, a radial wing at one side of the port, said radial wing being provided with a port, a tube extended into the tubular shaft, the said tube having a port, a tube surrounding the first named tube and having a port, and means connected with the last named tube and actuated from the tubular shaft for automatically controlling the admission of motive fluid to the casing.

3. A rotary engine comprising a casing, a tubular shaft extended into the chamber of the casing and having a port therein, a radial wing at one side of the port, said radial wing being provided with a port, a tube extended into the tubular shaft, the said tube having a port, a tube surrounding the first named tube and having a port, and means connected with one of the said tubes and actuated from the tubular shaft for automatically controlling the admission of motive fluid to the casing, substantially as described.

4. A rotary engine comprising a casing provided with a motive fluid chamber, a rotary abutment located in the casing in a chamber adjacent the motive fluid chamber, a tubular shaft extended into said motive fluid chamber and having a port, the shaft and the abutment being connected to rotate in unison, the motive fluid chamber being larger than the abutment chamber, the tubular shaft and the abutment being of the same diameter and in rolling contact with each other, a radial wing on said shaft adjacent the said port and also being provided with a port and engaging the abutment chamber, and means for introducing motive fluid to the other motive fluid chamber through the shaft.

5. A rotary engine comprising a motive agent casing, an abutment therein, a tubular shaft extended into the casing and having a port, a radial wing at one side of said port, a tube extended into the hollow shaft, and having a port, a ported tube having a rotative movement on the first-named tube, a rod, an arm on said rod, a link connection between said arm and the rotary tube, a governor for causing movements of said rod, and a driving connection between the governor and the shaft.

In testimony whereof, I affix my signature in presence of two witnesses.

WARREN FLOYD BLEECKER.

Witnesses:

A. J. O'Brien,

Dena Nelson.